US012037820B2

(12) United States Patent
Boykin

(10) Patent No.: US 12,037,820 B2
(45) Date of Patent: Jul. 16, 2024

(54) LATCHING HANDLE ASSEMBLY DOOR GUARD

(71) Applicant: SnatchLatch, LLC, Flower Mound, TX (US)

(72) Inventor: Timothy Boykin, Plano, TX (US)

(73) Assignee: SNATCHLATCH, LLC, Flower Mound, TX (US)

( * ) Notice: Subject to any disclaimer, the term of this patent is extended or adjusted under 35 U.S.C. 154(b) by 161 days.

(21) Appl. No.: 17/453,686

(22) Filed: Nov. 5, 2021

(65) Prior Publication Data

US 2023/0145548 A1 May 11, 2023

(51) Int. Cl.

*E05B 83/04* (2014.01)
*E05B 13/00* (2006.01)
*E05B 65/00* (2006.01)
*E05B 67/38* (2006.01)
*E05B 83/02* (2014.01)

(52) U.S. Cl.

CPC ............ *E05B 83/04* (2013.01); *E05B 13/002* (2013.01); *E05B 13/001* (2013.01); *E05B 65/0021* (2013.01); *E05B 67/38* (2013.01); *E05B 83/02* (2013.01)

(58) Field of Classification Search

CPC ........ E05B 83/04; E05B 67/38; E05B 13/001; E05B 65/0021; E05B 13/002; E05B 67/383; E05B 67/36; E05B 83/10; Y10T 292/31; Y10T 292/314; Y10T 292/319; Y10T 292/331; Y10T 292/48; Y10T 292/491; Y10T 292/494; Y10T 292/496; Y10T 292/495; Y10T 292/498; Y10T 292/499; Y10T 292/502; Y10T 292/503; Y10T 292/506; Y10T 292/509

See application file for complete search history.

(56) References Cited

U.S. PATENT DOCUMENTS 3,828,591 A * 8/1974 Beaver .................... E05B 67/38 70/56
4,106,315 A * 8/1978 Dohanyos ............... E05B 67/38 292/281
4,972,689 A * 11/1990 Anderson ............... E05B 67/38 70/56
5,141,266 A * 8/1992 Braun ..................... E05B 83/04 292/216
6,009,731 A * 1/2000 Emmons ................. E05B 39/00 292/281
6,010,166 A * 1/2000 Hamilton .............. E05B 13/002 70/56

(Continued)

OTHER PUBLICATIONS

Heavy Duty Rolling Door Lock; https://equipmentlock.com/product/heavy-duty-rolling-door-lock/; last accessed on Nov. 3, 2021.

(Continued)

*Primary Examiner* — Christine M Mills
*Assistant Examiner* — Faria F Ahmad
(74) *Attorney, Agent, or Firm* — KLEMCHUK PLLC

(57) ABSTRACT

A door guard for use with a latching handle assembly is disclosed. The door guard is configured to use the handle of the latching handle assembly in combination with components of the door guard to protect a pin that fits through a hole in the handle and into a lock of the door guard.

20 Claims, 5 Drawing Sheets

(56) References Cited

U.S. PATENT DOCUMENTS

| | | | | |
|---|---|---|---|---|
| 6,058,745 | A * | 5/2000 | Sanchez | E05B 67/38 70/56 |
| 6,233,984 | B1 * | 5/2001 | Blehi, III | E05B 39/02 70/2 |
| 6,519,982 | B1 * | 2/2003 | Brammall | E05B 67/38 292/205 |
| 6,823,701 | B1 | 11/2004 | Gogel | |
| 6,886,378 | B1 * | 5/2005 | Harris | E05B 67/36 70/56 |
| 6,915,670 | B2 | 7/2005 | Gogel | |
| 6,928,843 | B1 * | 8/2005 | Pirnie | E05B 67/38 292/284 |
| 6,983,629 | B1 | 1/2006 | Gogel | |
| 7,047,774 | B1 | 5/2006 | Gogel | |
| 7,162,898 | B2 | 1/2007 | Gogel | |
| 7,201,027 | B2 | 4/2007 | Gogel | |
| 7,201,028 | B1 | 4/2007 | Gogel | |
| 7,412,856 | B1 | 8/2008 | Gogel | |
| 7,878,032 | B1 | 2/2011 | Gogel | |
| 7,891,219 | B1 | 2/2011 | Gogel | |
| 8,011,213 | B1 | 9/2011 | Gogel | |
| 9,284,753 | B1 * | 3/2016 | Catlin | E05B 67/28 |
| 10,246,904 | B1 * | 4/2019 | White | E05F 15/77 |
| 11,346,135 | B1 * | 5/2022 | King | E05B 67/38 |
| 2010/0122559 | A1 * | 5/2010 | Chudzicki | E05C 3/045 70/91 |
| 2018/0010369 | A1 | 1/2018 | Witchey | |
| 2018/0313110 | A1 * | 11/2018 | Pare | E05B 13/001 |
| 2020/0248485 | A1 * | 8/2020 | Clark | E05C 19/08 |
| 2020/0392756 | A1 * | 12/2020 | Bunger | E05B 17/002 |
| 2021/0238889 | A1 * | 8/2021 | Maki | E05C 3/02 |
| 2021/0340791 | A1 * | 11/2021 | Morgan | E05B 67/383 |

OTHER PUBLICATIONS

Whiting Latch Guard; https://war-lok.com/products/whiting-roll-up-door-lock; last accessed on Nov. 3, 2021.
CargoGuard Latch Lock; https://www.transportsecurity.com/cargoguard-lock.html; last accessed on Nov. 3, 2021.
SecureSHIELD Locking System; https://www.whitingdoor.com/index.cfm?fuseaction=page.display&page_id=102; last accessed on Nov. 3, 2021.
Trailer Door Lock Box; https://www.transportsecurity.com/trailer-lock-box-html; last accessed on Nov. 3, 2021.
Ranger Lock Padlock Guard; https://www.amazon.com/Ranger-Lock-RGRU-0L-Rollup-Hardened/dp/B007PD6NPQ; last accessed on Nov. 3, 2021.

* cited by examiner

LATCHING HANDLE ASSEMBLY DOOR GUARD

FIELD OF THE DISCLOSURE

The present disclosure generally relates to storage container doors having a latch handle assembly thereon for locking the door in a closed position, and more particularly to a security guard for the latch handle assembly.

BACKGROUND

Box trucks, semi-trailers, trailers, shipping containers, and storage units can have doors that are closed and locked with a latching handle assembly. Padlocks are often used to lock the latching handle assembly and doors in place. However, thieves can break the padlocks with bolt cutters, axes, hammers, and other tools. Once the padlock is broken or otherwise compromised, a thief can open the latching handle assembly, open the door, and then access the contents of the container. Padlock guards are commercially available, and each is generally designed to hinder access to the padlock when the latching handle assembly is in the closed position. However, these designs merely cover the padlock, and thieves are still able to insert cutting tools into the cover to break the padlock.

SUMMARY

Disclosed herein are a door guard for use with a latching handle assembly and door guard system.

The door guard can include a guard body comprising a main plate, a bottom guard connected to a bottom of the main plate, and a side wall connected to a side of the main plate; a partition wall connected to a surface of the main plate, wherein the partition wall has a ridge formed in an upper portion thereof, wherein the ridge is configured to receive a handle of the latching handle assembly, wherein the partition wall has a first opening formed therein; a pin configured to extend through the first opening of the partition wall, wherein the pin is further configured to extend through a hole in the handle of the latching handle assembly when the door guard is placed on the latching handle assembly and the handle is received in the ridge of the partition wall; and a lock connected to the surface of the main plate and to the side wall, wherein the lock is configured to receive an end of the pin, wherein the lock contains a locking mechanism configured to secure the end of the pin within the lock; wherein the guard body, the partition wall, and the lock are arranged to at least substantially enclose a portion of the pin that extends through the hole in the handle of the latching handle assembly when the door guard is placed on the latching handle assembly.

The door guard system can include the above-mentioned door guard and the latching handle assembly.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1B:
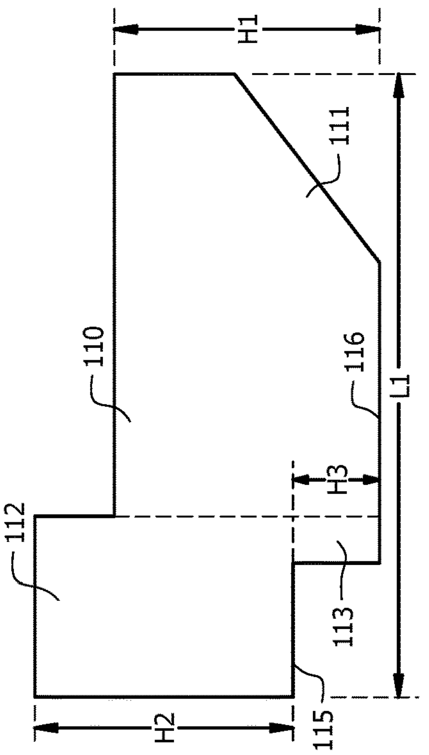
FIG. 1B illustrates a side view of the main plate of door guard of FIG. 1A.

"Latching handle assembly" as used herein refers to an assembly for a container door that is attached to the door and that has a mechanism that couples to a floor, ceiling, or wall of the container. The latching handle assembly can have a handle that is movable (e.g., pivotable) from an open position in which the door can be opened to a closed position in which the door is closed. The latching handle assembly can have a latch attached to the door that receives the handle therein, and the latch has a hole formed in a portion thereof (e.g., a hole in a locking plate of the latch). The hole in the latch is configured to align with a hole formed in an end of the handle when the handle is moved to the closed position. The aligned holes are configured to receive a locking mechanism, e.g., a padlock, when the handle and latch holes are aligned. The handle can also be connected to a hook that can move with the handle when the handle is moved from an open position to a closed position, or vice versa, to secure the door in the closed position or allow the door to be raised or moved to the open position. An example of a latching handle assembly is disclosed in U.S. Pat. No. 3,642,314, which is incorporated by reference herein in its entirety.

Disclosed herein is a door guard for use with a latching handle assembly and a door guard system that includes the latching handle assembly. The terms "door guard" and "latching handle assembly door guard" can be used interchangeably, and the terms "door guard system" and "latching handle assembly door guard system" can be used interchangeably.

Various embodiments of a door guard are disclosed. The door guard is generally configured to lock a latching handle assembly in place while restricting access to a pin that locks the handle of the latching handle assembly. A padlock is not used to lock the handle in place. The door guard may be configured and positioned on the latching handle assembly such that bolt cutters cannot reach the pin, while allowing a user to access a lock of the door guard to unlock the lock of the door guard. More particularly, the door guard can have a guard body, a partition wall, and a lock that are arranged to substantially enclose a portion of the pin that extends through a hole in the handle and a hole in the latch of the latching handle assembly when the door guard is placed on the latching handle assembly. By extending through the hole of the handle and a hole in the latch (e.g., a hole in the locking plate of the latch) of the latching handle assembly, the pin locks the latching handle assembly in place against the door, and the door guard in combination with the latching handle assembly substantially encloses the portion of the pin that extends through the hole of the handle and the hole of the latch.

"Substantially encloses" and variations thereof as used herein mean that the pin is not accessible by bolt cutters or other lock cutting tool when the door guard is placed on the latching handle assembly.

The door guard can generally be made of steel, brass, chrome, copper, tungsten, hard plastics, silicon carbide, other durable materials, or combinations thereof.

Figure 1C:
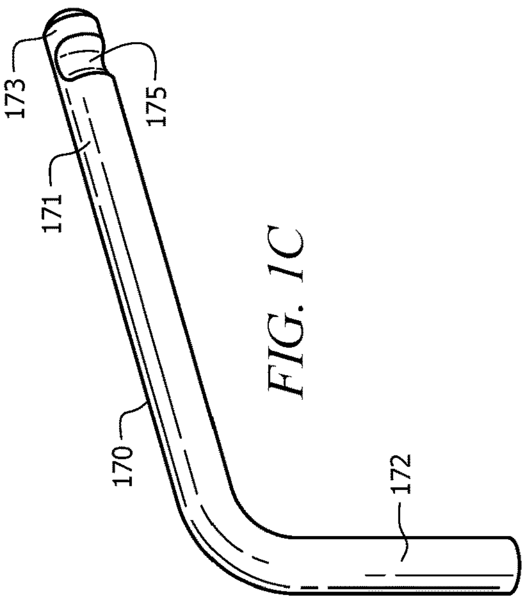
FIG. 1C illustrates a perspective view of the pin of the door guard of FIG. 1A.
Figure 1A:
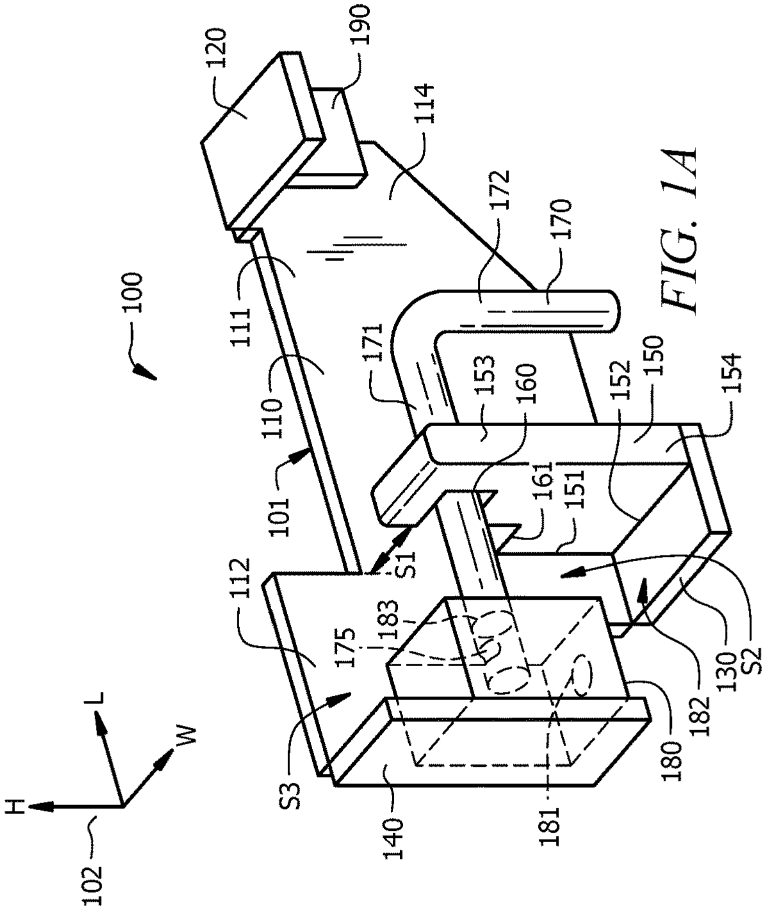
FIG. 1A illustrates a perspective view an embodiment of a door guard according to the disclosure.

FIG. 1A illustrates a perspective view of an embodiment of the door guard 100. FIG. 1B illustrates a side view of the main plate 110 of the door guard 100, and FIG. 1C illustrates a perspective view of an embodiment of the pin 170 of FIG. 1A. The door guard 100 has a guard body 101, a partition wall 150, a pin 170, and a lock 180.

A reference coordinate system 102 is illustrated in FIG. 1A to show the directions in which length L, height H, and width W will be discussed for the embodiments illustrated in all the drawings.

The guard body 101 can include a main plate 110, a top guard 120, a bottom guard 130, and a side wall 140. Alternative embodiments of the guard body 101 can have more than one top guard 120, more than one bottom guard 130, more than one side wall 140, or combinations thereof.

With reference to FIGS. 1A and 1B, the main plate 110 is generally a piece of shaped metal or impact resistant polymer that is flat, concave, convex, or combinations thereof. In FIG. 1A, the main plate 110 is a flat piece of metal. The main plate 110 can be described as having integrally formed sections 111, 112, and 113 that are arranged to form the polygonal shape of the main plate 110 shown in FIGS. 1A and 1B. The first section 111 can generally have a pentagonal shape (e.g., with three right angles), the second section 112 can generally have a rectangular shape, and the third section 113 can have a rectangular shape.

With reference to FIG. 1B, the first section 111 can have a height H1 in a range of from about 1 to about 10 inches; alternatively, from about 2 to about 4 inches; alternatively, of about 3 inches (e.g., 3.149 inches). The second section 112 can have a height H2 in a range of about 1 to about 10 inches; alternatively, from about 2 to about 3 inches; alternatively, a height H2 of about 3 inches (e.g., 2.953 inches). The third section 113 can have a height H3 in a range of from about 0.5 to about 3 inches; alternatively, from about 0.5 to about 2 inches; alternatively, a height H3 of about 1 inch (e.g., 1.181 inches). With reference to FIG. 1B, the main plate 110 can have a length L1 in a range of from about 1 to about 20 inches; alternatively, from about 6 to about 8 inches; alternatively, a length L1 of about 7 inches (e.g., 7.087 inches).

The first section 111 and second section 112 are generally placed side-by-side, with a bottom 115 of the second section 112 positioned higher relative to a bottom 116 of the first section 111 by a distance equal to the height H3 of the third section 113. In this configuration, the third section 113 is also placed side-by-side with the first section 111 and under the second section 112.

The main plate 110 can have a width in a range of about 0.1 to about 1 inch; alternatively, a width of about 0.25 inch (e.g., 0.236 inch).

The top guard 120 is generally a piece of shaped metal or impact resistant polymer that is flat, concave, convex, or combinations thereof. In FIG. 1A, the top guard 120 is a flat piece of metal. The top guard 120 can be generally rectangular in shape. In embodiments, a plane of the top guard 120 can extend perpendicular with respect to a plane of the main plate 110. The top guard 120 can be made of the same material as the main plate 110. The top guard 120 can be connected to the first section 111 of the main plate 110. The top guard 120 can be connected to a top surface of the first section 111 main plate 110 or can be connected to a surface 114 of the main plate 110 on the first section 111.

The top guard 120 can have a length in a range of from about 0.5 to about 8 inches; alternatively, from about 0.5 to about 4 inches; alternatively, a length of about 1 inch (e.g., 0.984 inch). The top guard 120 can have a width in a range of from about 1 to about 5 inches; alternatively, from about 1 to about 3 inches; alternatively, a width of about 2 inches (e.g., 1.772 inches). The top guard 120 can have a height in a range of from about 0.1 to about 1 inch; alternatively, a height of about 0.236 inch.

In embodiments, the door guard 100 can also have a securing plate 190 illustrated in FIG. 1A. The securing plate 190 can be attached to the top guard 120 and to the main plate 110, and can extend perpendicularly downward from the top guard 120 in a plane that is parallel to the plane of the main plate 110. The securing plate 190 can function as a spacer that further limits lateral movement of the handle of the latching handle assembly when the door guard 100 is positioned over and coupled with the latching handle assembly. In these embodiments, the main plate 110, the top guard 120, and the securing plate 190 of the door guard 100 are configured to surround the handle of the latching handle assemble, preventing movement of the handle.

The bottom guard 130 is generally a piece of shaped metal or impact resistant polymer that is flat, concave, convex, or combinations thereof. In FIG. 1A, the bottom guard 130 is a flat piece of metal. The bottom guard 130 can be generally rectangular in shape. In embodiments, a plane of the bottom guard 130 can extend perpendicular with respect to the plane of the main plate 110. In embodiments, the plane of the bottom guard 130 can extend parallel with respect to the plane of the top guard 120. The bottom guard 130 can be made of the same material as the main plate 110. The bottom guard 130 can be connected to the second section 112 of the main plate 110. In some embodiments, the bottom guard 130 can be connected to first section 111 and the second section 112 of the main plate 110, for example, including where the first section 111 and the second section 112 meet. The bottom guard 130 can be connected to the surface 114 of the main plate 110. The bottom guard 130 can be positioned to restrict access to the partition wall 150, pin 170, and lock 180. In the embodiment depicted in FIG. 1A, the bottom guard 130 is positioned to restrict access to the space S2 where the opening 183 of the lock 180 accepts the pin 170.

The bottom guard 130 can have a width in a range of about 1 to about 5 inches; alternatively, a width of about 2 inches (e.g., 1.772 inches). The bottom guard 130 can have a length in a range of about 0.5 to about 8 inches; alternatively, a length of about 1.26 inches. The bottom guard 130 can have a height in a range of about 0.1 to about 1 inch; alternatively, a height of about 0.236 inches.

The side wall 140 is generally a piece of shaped metal or impact resistant polymer that is flat, concave, convex, or combinations thereof. In FIG. 1A, the side wall 140 is a flat piece of metal. The side wall 140 can be generally rectangular in shape. The side wall 140 can be made of the same material as the main plate 110. The side wall 140 can be connected to the second section 112 of the main plate 110. The side wall 140 can be connected to a side surface of the second section 112 of the main plate 110 or can be connected to the surface 114 of the main plate 110. In embodiments, a plane of the side wall 140 can extend perpendicular with respect to the plane of the main plate 110, the plane of the top guard 120, and the plane of the bottom guard 130. The side wall 140 can be positioned to block access to the lock 180 from the side of the door guard 100.

The side wall 140 can have a length in a range of about 0.5 to about 1 inch; alternatively, a length of about 0.236 inch. The side wall 140 can have a width in a range of about 0.5 to about 8 inches; alternatively, a width of about 1.3 inches. The side wall 140 can have a height in a range of from about 1 to about 8 inches; alternatively, from about 2 to about 6 inches; alternatively, from about 3 to about 5 inches; alternatively, a height of about 4 inches (e.g., 4.134 inches).

The partition wall 150 can be connected to the surface 114 of the main plate 110 such that there is a space S1 formed for a handle of the latching handle assembly between an upper portion 153 of the partition wall 150 and the main plate 110. The partition wall 150 is generally a piece of shaped metal or impact resistant polymer that is flat, concave, convex, or combinations thereof. In FIG. 1A, the partition wall 150 is a flat piece of metal. The partition wall 150 can have a side 151 connected to surface 114 of the main plate 110 and a bottom 152 connected to the bottom guard 130. The opposite side 154 of the partition wall 150 is the side that is placed against a door of the storage container. The partition wall 150 can have an opening 160 formed in the upper portion 153 thereof such that the space S1 is formed between the main plate 110 and the upper portion 153 of the partition wall 150. The partition wall 150 can also have a ridge 161 formed therein proximate to the side 151, and in some embodiments, in spatial communication with the opening 160. A handle of a latching handle assembly can pass downwardly through the space S1 so as to rest on the ridge 161 formed in the partition wall 150, and a pin 170 of the door guard 100 can be placed in the opening 160 (the pin 170 is described in more detail below).

In embodiments, the partition wall 150 is configured to absorb shock and vibration to protect the integrity of the pin 170. For example, in a scenario where a would-be thief attempts to break the door guard 100 by swinging a hammer against the door guard 100, the partition wall 150 can absorb the shock of the hammer blows to the guard body 101 such that none of the blows are able to bend, break, or damage the pin 170.

The partition wall 150 can have a length in a range of from about 0.1 to about 1 inch; alternatively, a length of about 0.5 inch (e.g., 0.472 inch). The partition wall 150 can have a width in a range of from about 1 to about 5 inches; alternatively, from about 1 to about 2 inches; alternatively, a width of about 1.772 inches. The partition wall 150 can have a height in a range of from about 0.5 to about 8 inches; alternatively, a height of about 3 inches (e.g., 2.914 inches).

The ridge 161 can have a length in a range of from about 0.1 to about 1 inch; alternatively, a length of about 0.591 inches. The ridge 161 can have a height in a range of about 0.5 to about 5 inches; alternatively, a height of about 1.575 inches. The opening 160 in the partition wall 150 can have a dimension (e.g., diameter, length) that is greater than a diameter of the pin 170.

The pin 170 is configured to fit through a hole in the latching handle assembly (e.g., a hole in the end of the handle and a hole in the locking plate of the latch) and the opening 160 in the partition wall 150. In embodiments, the pin 170 is a rod, where the rod can be linear or bent into an L-shape. An end 173 of the pin 170 can have a notch 175 formed therein. In embodiments, the pin 170 can generally have a first portion 171 and a second portion 172 integrally formed into a L-shaped rod. The first portion 171 of the pin 170 can have the notch 175 formed on the end 173 thereof.

The first portion 171 can have a length in a range of about 0.5 to about 10 inches; alternatively, a length of about 4.6 inches. The second portion 172 of the pin 170 can have a length in a range of about 0.5 to about 10 inches; alternatively, a length of about 2.2 inches. The pin 170 can have a diameter in a range of about 0.2 to about 1 inch; alternatively, from about 0.2 to about 0.5 inch; alternatively, a diameter of about 0.4 inch (e.g., 0.394 inch). The diameter of the pin 170 is generally thicker than a diameter of a padlock and is thus more resistant to being cut by bolt cutters than a typical padlock.

The lock 180 is configured to accept an end 173 of the pin 170 having the notch 175 formed therein. The lock 180 can be attached to the main plate 110 and to the side wall 140. Nonlimiting examples of the lock 180 can include a rotating cam lock, a rim cylinder lock, a Mortise cylinder lock, a wall mounted lock, a bolt style lock, a disk lock, a push lock, or combinations thereof. The lock 180 may have a locking mechanism 181 contained therein that is movable between a locked position and an unlocked position so as to lock and unlock the lock 180 when the end 173 of the pin 170 having the notch 175 is received in the lock 180. The locking mechanism 181 is illustrated in FIG. 1A as a dashed-line circle on the bottom of the lock 180; however, it is to be understood that user access to the lock 180 can be via the illustrated area for the locking mechanism 181, and other portions of the locking mechanism 181 (e.g., internal parts that engage the notch 175 of the pin 170) can be contained within the lock 180, are known in the art with the aid of this disclosure, and are not illustrated for clarity.

The lock 180 can have a length in a range of from about 1 to about 10 inches; alternatively, a length of about 1.2 inches (e.g., 1.181 inches). The lock 180 can have a width in a range of about 1 to about 10 inches; alternatively, a width of about 1.3 inches. The lock 180 can have a height in a range of about 1 to about 10 inches; alternatively, a height of about 1.7 inches.

The main plate 110, the bottom guard 130, the side wall 140, and the partition wall 150 are configured and arranged such that the locking mechanism 181 is accessible and an opening 182 is formed between the bottom of the lock 180 and the top of the bottom guard 130. In the embodiment illustrated in FIG. 1A, the locking mechanism 181 faces downward toward the opening 182 that is formed by the arrangement of the main plate 110, the bottom guard 130, the side wall 140, and the partition wall 150 of the door guard 100. The lock 180 can be connected to the main plate 110 and to the side wall 140 such that the locking mechanism 181 is not blocked by the bottom guard 130; and the main plate 110, the bottom guard 130, the partition wall 150, and the lock 180 are arranged to block access to a space S2 in which the portion 171 of the pin 170 can be received when locking the pin 170 in the lock 180, and in which the portion 171 of the pin 170 is inserted into the holes of the handle and latch of the latching handle assembly when the door guard 100 is placed on the latching handle assembly. The lock 180 can also have an opening 183 formed on a side thereof that is configured to receive the end 173 of the pin 170. The lock 180 can be configured such that the opening 183 faces towards the partition wall 150 of the door guard 100.

The main plate 110, the top guard 120, the side wall 140, the partition wall 150, and the lock 180 are configured and arranged to form a space S3. The space S3 formed by the arrangement is configured to receive the handle, the latch, or both the handle and the latch of the latching handle assembly of the door that is to be guarded by the door guard 100. In the embodiment of the door guard 100 depicted in FIG. 1A, the second section 112 of the main plate 110 is taller than the first section 111 to protect the lock 180 and the latch of a latching handle assembly that is received in space S3. The top guard 120 can be a separate piece of the same material as the main plate 110 that is then attached to the main plate 110. The top guard 120 can be attached to a portion of the main plate 110 that covers a portion of the handle of the latching handle assembly. The top guard 120 is configured to extend over the handle to prevent the handle from being lifted vertically while the door guard 100 is positioned over and coupled with the latching handle assembly.

Currently available door guards cover the latching handle assembly of a container after the assembly has been locked with a padlock or other type of primary locking device. These door guards provide limited access to the padlock; however, it is possible for thieves to insert lock cutting devices into the currently available door guards for access to the padlock. The door guard 100 in FIG. 1A has the pin 170 extending through the handle and latch (e.g., a hole in the locking plate of the latch) of the latching handle assembly of a container door instead of a padlock. Moreover, the door guard 100 uses the main plate 110, partition wall 150, bottom guard 130, and side wall 140 to substantially enclose the pin 170 and prevent access to the pin 170, except for the opening 182 that is formed by the arrangement of the main plate 110, the partition wall 150, the bottom guard 130, and the side wall 140 for access to the locking mechanism 181 of the lock 180. However, the dimensions of the opening 182 (e.g., a height in a range of from about 0.1 to about 0.3 inch; alternatively, a height of about 0.236 inch; and a width that matches the width of the bottom guard 130) are configured such that bolt cutters or other lock cutting tools do not fit through the opening 182 and into the space S2 that contains the pin 170. Moreover, by integrating a securing mechanism (e.g., the pin 170) of the door guard 100 for the latching handle assembly into the door guard 100 itself and using portions of the door guard 100 to block access to the pin 170, the disclosed door guard 100 removes access to the traditionally used padlock (because no padlock is used) and blocks access to the pin 170 from all sides and from the bottom of the door guard 100. When used on a latching handle assembly, access to the pin 170 from above is blocked by the handle of the latching handle assembly that is received in space S1 and the latch of the latching handle assembly that is received in space S2. In some embodiments, an additional top guard, such as the top guard 220A described for door guard 200 in FIG. 2A, can block access to the pin 170 from the top of the door guard 100.

Figure 2A:
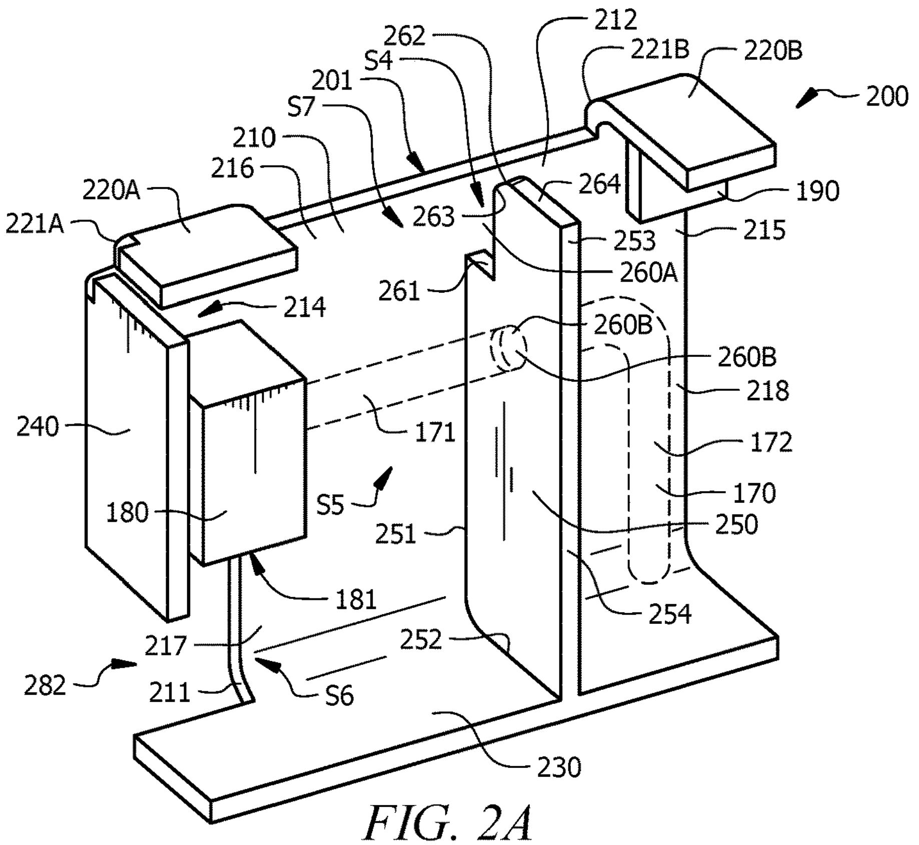
FIG. 2A illustrates a perspective view of another embodiment of a door guard according to the disclosure.
Figure 2B:
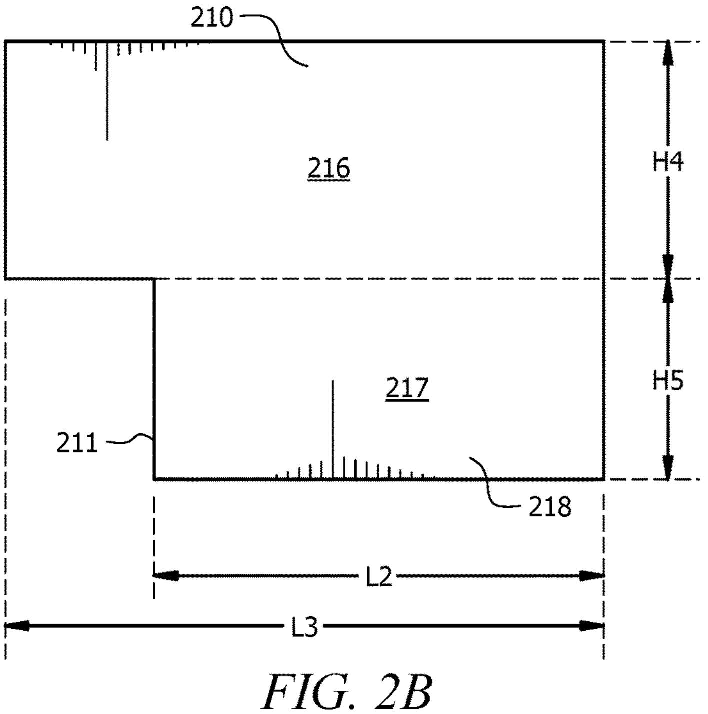
FIG. 2B illustrates a side view of the main plate of the door guard of FIG. 2A.

FIG. 2A depicts a perspective view of another embodiment of the door guard 200. FIG. 2B illustrates a side view of the surface 218 of the main plate 210 of the door guard of FIG. 2A.

The door guard 200 has a guard body 201, a partition wall 250, the pin 170 of FIGS. 1A and 1C (shown in dashed lines), and the lock 180 of FIG. 1A.

The guard body 201 can include a main plate 210, two top guards 220A and 220B, a bottom guard 230, and a side wall 240. Alternative embodiments of the guard body 201 can have more than two top guards 220A and 220B, more than one bottom guard 230, more than one side wall 240, or combinations thereof. The arrangement and dimensions of the main plate 210, two top guards 220A and 220B, the bottom guard 230, and the side wall 240 are different than the arrangement and dimensions of the main plate 110, top guard 120, bottom guard 130, and side wall 140 of FIG. 1A.

The main plate 210 is generally a piece of shaped metal or impact resistant polymer that is flat, concave, convex or combinations thereof. In FIG. 2A, the main plate 210 is a flat piece of metal having a curved bottom 211 that connects with the bottom guard 230. The main plate 210 can be generally rectangular in shape.

The main plate 210 can have a length in a range of from about 1 to about 20 inches; alternatively, from about 2 to about 10 inches; alternatively, from about 3 to about 8 inches; alternatively, a length of about 6 inches; alternatively, a length of about 6.4 inches. The main plate 210 can have a height in a range of from about 1 to about 10 inches; alternatively, from about 5 to about 6 inches; alternatively, a height of about 5.75 inches. The main plate 110 can have a width in a range of from about 0.1 to about 1 inch; alternatively, from about 0.2 to about 0.3 inch; alternatively, a width of about 0.236 inch.

The main plate 210 can have two integrally formed sections 216 and 217 arranged such that the first section 216 is above the second section 217. The first section 216 can generally have a rectangular shape, and the second section 217 can generally have a rectangular shape. The first section 216 can have a length L2 that is greater than a length L3 of the second section 217. The length L2 of the first section 216 can be greater than the length L3 of the second section 217 by an amount in a range of from about 0.5 to about 5 inches; alternatively, from about 1 to about 2 inches; alternatively, a length of about 1.811 inches. The first section 216 can have a height H4 in a range of from about 2 to about 10 inches; alternatively, from about 2 to about 8 inches; alternatively, from about 2 to about 6 inches; alternatively, a height H4 of about 3 inches. The second section 217 can have a height H5 in a range of from about 0.5 to about 5 inches; alternatively, from about 2 to about 3 inches; alternatively, a height H5 of about 2.165 inches.

The two top guards 220A and 220B are generally pieces of shaped metal or impact resistant polymer that are flat, concave, convex, or combinations thereof. In FIG. 2A, the two top guards 220 are flat pieces of metal with curved ends 221A and 221B that connect to the top 212 of the main plate 210. In embodiments, the two top guards 220 can be generally rectangular in shape. In FIG. 2A, the first top guard 220A can be seen connected to a side 214 of the main plate 210, and the second top guard 220B can be seen connected to an opposite side 215 of the main plate 210. Each of the top guards 220A and 220B can be connected to a top surface of the main plate 210 or to the surface 218 of the main plate 210. Top guard 220A is configured to prevent access to the lock 180 and to the latch of a latching handle assembly that is placed in space S7 of the door guard 200. Top guard 220B is configured to prevent access to the handle of the latching handle assembly.

The door guard 200 can additionally include the securing plate 190, which is the same as described for door guard 100 in FIG. 1A, and said description is not reproduced here.

The first top guard 220A can have a length in a range of about 1 to about 5 inches; alternatively, from about 1 to about 3 inches; alternatively, a length of about 1.535 inches. The first top guard 220A can have a width in a range of from about 0.5 to about 2 inches; alternatively, a width of about 0.984 inch. The first top guard 220A can have a height in a range of about 0.1 to about 1 inch; alternatively, from about 0.2 to about 0.5 inch; alternatively, a height of about 0.236 inch.

The second top guard 220B can have a length in a range of from about 0.5 to 4 inches; alternatively, from about 0.5 to 2 inches; alternatively, a length of about 1 inch (e.g., 0.984 inch). The second top guard 220B can have a width in a range of from about 1 to about 2 inches; alternatively, a width of about 1.535 inch. The second top guard 220B can have a height in a range of about 0.1 to about 1 inch; alternatively, from about 0.2 to about 0.5 inch; alternatively, a height of about 0.236 inch.

The bottom guard 230 is generally a piece of shaped metal or impact resistant polymer that is flat, concave, convex, or combinations thereof. In embodiments, the bottom guard 230 can be made of the same piece of material as the main plate 210 and bent or shaped into position. In FIG. 2A, the bottom guard 230 is a flat piece of metal that is connected or integrally formed with the bottom 211 of the main plate 210. The bottom guard 230 can be generally rectangular in shape. The bottom guard 230 can be connected to the bottom 211 of the main plate 210. The bottom guard 230 is configured to prevent or restrict access to the partition wall 250, pin 170, and lock 180 from below the door guard 200. In the embodiment depicted in FIG. 2A the bottom guard 230 extends the entire length of the door guard 200.

The bottom guard 230 can have a length in a range of about 0.5 to about 20 inches; alternatively, from about 6 to about 7 inches; alternatively, a length of about 6.85 inches. The bottom guard 230 can have a width in a range of about 1 to about 5 inches; alternatively, from about 2 to about 3 inches; alternatively, a width of about 2.008 inches. The bottom guard 230 can have a height in a range of about 0.1 to about 1 inch; alternatively, from about 0.2 to about 0.3 inch; alternatively, a height of about 0.236 inch.

The side wall 240 can be generally rectangular in shape. The side wall 240 can be connected to the main plate 210. The side wall 240 can be connected to a side surface of the main plate 210 or can be connected to the surface 218 of the main plate 210. In embodiments, the side wall 240 can be made of the same piece of material as main plate 210 and may be bent or shaped into position. The side wall 240 can be positioned to block access to the lock 180 from the side of the door guard 200.

The side wall 240 can have a length in a range of about 0.1 to about 1 inch; alternatively, from about 0.2 to about 0.3 inch; alternatively, a length of about 0.236 inch. The side wall 240 can have a width in a range of about 1 to about 5 inches; alternatively, from about 1 to about 2 inches; alternatively, a width of about 1.772 inches. The side wall 240 can have a height in a range of about 0.5 to about 8 inches; alternatively, from about 3 to about 4 inches; alternatively, a height of about 3.071 inches.

The partition wall 250 is generally a piece of shaped metal or impact resistant polymer that is flat, concave, convex, or combinations thereof. In FIG. 2A, the partition wall 250 is a flat piece of metal. The partition wall 250 can have a side 251 connected to the main surface 218 of the main plate 210 and a bottom 252 that is connected to the bottom guard 230. The opposite side 254 of the partition wall 250 is the side that is placed against a door of the storage container. The partition wall 250 can have a first opening 260A and a second opening 260B formed in an upper portion 253 thereof. The first opening 260A is formed in the upper portion 253 of the partition wall 250 proximate to the side 251 of the partition wall 250 such that a space S4 is formed between the upper portion 253 of the partition wall 250 and the main plate 210. The partition wall 250 has a ridge 261 at the bottom of the opening 260A. A handle of a latching assembly can pass downwardly through the space S4 so as to rest on the ridge 261 formed on the partition wall 250. The side 263 of the top 264 of the upper portion 253 of the partition wall 250 has a chamfer 262 formed thereon. The chamfer 262 faces the main surface 218 of the main plate 210. The second opening 260B can have any shape, for example, a shape that matches the cross-sectional shape (e.g., circle, square, triangle, other polygonal shape) of the pin 170. The second opening 260B is configured to receive the pin 170 of the door guard 200.

The partition wall 250 can have a length in a range of about 0.1 to about 1 inch; alternatively, from about 0.2 to about 0.3 inches; alternatively, a length of about 0.236 inches. The partition wall 250 can have a width in a range of about 1 to about 5 inches; alternatively, from about 1 to about 2 inches; alternatively, a width of about 1.772 inches. The partition wall 150 can have a height in a range of about 0.5 to about 8 inches; alternatively, from about 5 to about 6 inches; alternatively, a height of about 5.276 inches.

In embodiments, the partition wall 250 is configured to absorb shock and vibration to protect the integrity of the pin 170. For example, in a scenario where a would-be thief attempts to break the door guard 200 by swinging a hammer against the door guard 200, the partition wall 250 can absorb the shock of the hammer blows to the guard body 201 such that none of the blows are able to bend, break, or damage the pin 170.

The pin 170 and lock 180 can be embodied as the pin 170 and the lock 180 of the door guard 100 in FIG. 1A and FIG. 1B, and as such, said descriptions are not reproduced here.

The main plate 210, the bottom guard 230, the side wall 240, and the partition wall 250 are configured and arranged such that an opening 282 is formed for access to the locking mechanism 181 of the lock 180. In the embodiment illustrated in FIG. 2A, the locking mechanism 181 faces downward toward the bottom guard 230 that is formed by the arrangement of the main plate 210, the bottom guard 230, the side wall 240, and the partition wall 250 of the door guard 200. The lock 180 can be connected to the main plate 210 and to the side wall 240 such that the locking mechanism 181 is not blocked by the bottom guard 230; and the main plate 210, the bottom guard 230, the partition wall 250, and the lock 180 are arranged to hinder access to a space S5 in which the portion 171 of the pin 170 can be received when locking the pin 170 in the lock 180, and in which the portion 171 of the pin 170 is inserted into the latch of the latching handle assembly when the door guard 200 is placed on the latching handle assembly. The lock 180 can also have an opening (e.g., opening 183 in FIG. 1A) formed on a side thereof that is configured to receive the end (e.g., end 173 in FIG. 1A and FIG. 1C) of the pin 170. The lock 180 can be configured such that the opening 183 faces towards the partition wall 250 of the door guard 200. In FIG. 2A, it can be seen that access to the locking mechanism 181 of the lock 180 is below the first section 216 on side 214 of the main plate 210, such that a user inserts a key through the opening 282 and upward through the space S6 into the locking mechanism 181 of the lock 180.

The dimensions of the opening 282 (e.g., a height in a range of from about 0.5 to about 5 inches; alternatively, from about 2 to about 3 inches; alternatively, a height of about 2.165 inches; and a width that matches the width of the bottom guard 230) are configured such that bolt cutters or other lock cutting tools do not fit through the opening 282 and into the space S5 that contains the pin 170.

The main plate 210, the first top guard 220A, the side wall 240, the partition wall 250, and the lock 180 are configured and arranged to form a space S7. The space S7 formed by the arrangement is configured to receive the handle, the latch, or both the handle and the latch of the latching handle assembly of the door that is to be guarded by the door guard 200. In the embodiment of the door guard 200 depicted in FIG. 2A, the first top guard 220A is configured to protect the lock 180 and the latch of a latching handle assembly that is received in space S7. The second top guard 220B can be configured to cover another portion of the handle of the latching handle assembly. The second top guard 220A is configured to extend over the handle to prevent the handle from being lifted vertically while the door guard 200 is positioned over and coupled with the latching handle assembly.

The door guard 200 in FIG. 2A uses a pin 170 to insert through the latch of the latching handle assembly of a container door instead of a padlock. Moreover, the door guard 200 uses the main plate 210, partition wall 250, bottom guard 230, and side wall 140 to surround and prevent access to the lock 180, except for the opening 282 that is formed by the arrangement of the main plate 210, the partition wall 250, the bottom guard 230, and the side wall 240 for access to the locking mechanism 181 of the lock 180. By integrating a securing mechanism for the latching handle assembly (e.g., the pin 170) into the door guard 200 itself and using portions of the door guard 200 to block access to the pin 170, the disclosed door guard 100 removes access to the traditionally used padlock (because no padlock is used) and blocks access to the pin 170 in space S5 in all directions except for the direction that the user accesses the locking mechanism 181.

Figure 3A:
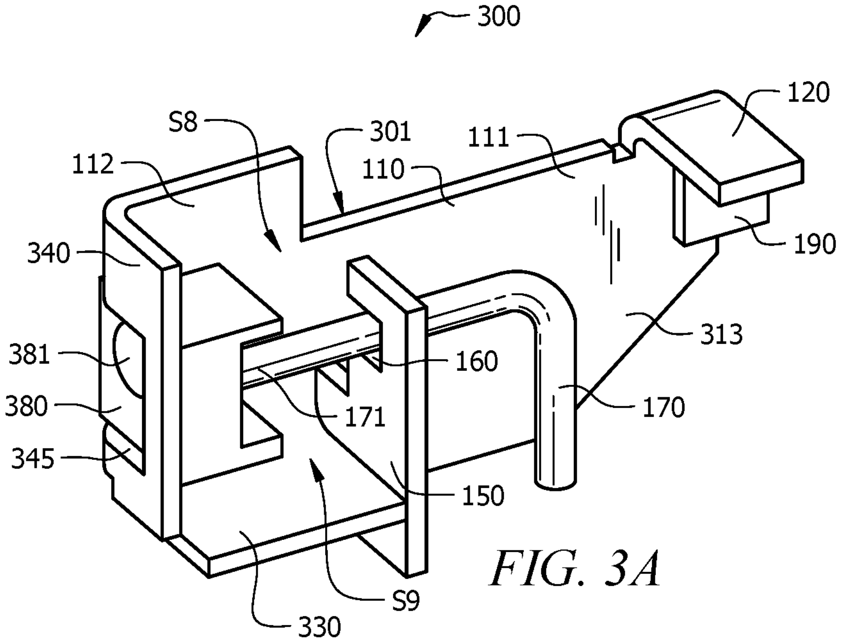
FIG. 3A illustrates a perspective view of another embodiment of a door guard according to the disclosure.
Figure 3B:
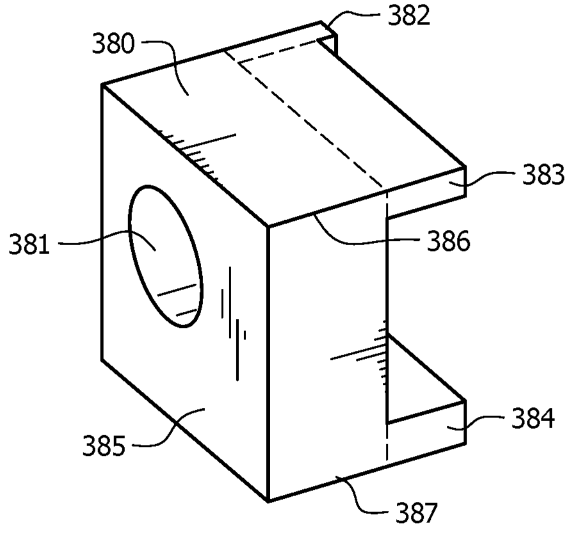
FIG. 3B illustrates an isolated perspective view of the lock in FIG. 3A.

FIGS. 3A and 3B depict a perspective view of a door guard 300 and a perspective view of the lock 380, respectively. The door guard 300 has a guard body 301, the partition wall 150 of FIG. 1A, the pin 170 of FIGS. 1A and 1B, and the lock 380.

The guard body 301 can include the main plate 110 of FIG. 1A, the top guard 120 of FIG. 1A, a bottom guard 330, and a side wall 340

The main plate 110 is described for the door guard 100 of FIGS. 1A and 1*s* further illustrated in FIG. 1B, and said descriptions are not reproduced here.

The top guard 120 is described for the door guard 100 of FIG. 1A, and said description is not reproduced here. The embodiment of the door guard 300 illustrated can include the securing plate 190 illustrated and described for FIG. 1A.

The bottom guard 330 is generally a piece of shaped metal or impact resistant polymer that is flat, concave, convex, or combinations thereof. In FIG. 3A, the bottom guard 330 is a flat piece of metal. The bottom guard 330 can be made of the same piece of material as the main plate 110 and bent or shaped into position. The bottom guard 330 can be generally rectangular in shape. The bottom guard 330 can be connected to the second section 112 of the main plate 110. The bottom guard 330 can be connected to a bottom surface of the second section 112 of the main plate 110 or can be connected to the surface 313 of the main plate 110 on the second section 112. In embodiments, the bottom guard 330 can extend perpendicular with respect to the from main plate 110 and parallel to the top guard 120. The bottom guard 330 can be positioned to restrict access to the first portion 171 of the pin 170 and the lock 380. In the embodiment depicted in FIG. 3A, the bottom guard 330 extends between the side wall 340 and the partition wall 150. Other embodiments of the door guard 300 depicted in FIG. 3A can have additional bottom guard(s) on the first section 111 of the main plate 110 to restrict some access to the second portion 172 of the pin 170.

The bottom guard 330 can have a length in a range of about 0.5 to about 8 inches; alternatively, from about 2 to about 3 inches; alternatively, a length of about 2.323 inches. The bottom guard 330 can have a width in a range of about 1 to about 5 inches; alternatively, from about 2 to about 3 inches; alternatively, a width of about 1.772 inches. The bottom guard 330 can have a height in a range of about 0.1 to about 1 inch; alternatively, from about 0.2 to about 0.3 inch; alternatively, a height of about 0.236 inch.

The side wall 340 is generally a piece of shaped metal or impact resistant polymer that is flat, concave, convex, or combinations thereof. The side wall 340 can be made of the same piece of material as main plate 110 and can be bent or shaped into position. The side wall 340 can be generally rectangular in shape. The side wall 340 can be connected to the second section 112 of the main plate 110. The side wall 340 can be connected to a side surface of the second section 112 of the main plate 110 or can be connected to the surface 313 of the main plate 110.

The side wall 340 can have a length in a range of about 0.1 to about 1 inch; alternatively, from about 0.2 to about 0.3 inches; alternatively, a length of about 0.236 inches. The side wall 340 can have a width in a range of about 1 to about 5 inches; alternatively, from about 1 to about 2 inches; alternatively, a width of about 1.535 inches. The side wall 340 can have a height in a range of about 0.5 to about 8 inches; alternatively, from about 3 to about 4 inches; alternatively, a height of 3.189 inches.

The side wall 340 has an opening 345 formed therein. The opening 345 can be positioned closer to the side of the side wall 340 that is connected to the second section 112 of the main plate 110. The opening 345 can have a width in a range of about 0.5 to about 4.5 inches; alternatively, from about 1 to about 2 inches; alternatively, a width of about 1.141 inches. The opening 345 can have a height in a range of about 0.25 to about 7.5 inches; alternatively, from about 1 to about 2 inches; alternatively, a height of about 1.614 inches. The length of the opening is the same as the length of the side wall 340, since it is an opening in the side wall 340.

The partition wall 150 is described for the door guard 100 in FIG. 1A, and said description is not reproduced here.

The pin 170 is described for the door guard 100 in FIG. 1A, and further illustrated in FIG. 1C, and said descriptions are not reproduced here.

The lock 380 is configured to accept an end 173 of the pin 170 having the notch 175 formed therein. The lock 380 can be attached to the main plate 110 and to the side wall 340. Nonlimiting examples of the lock 380 can include a rotating cam lock, a rim cylinder lock, a Mortise cylinder lock, a wall mounted lock, a bolt style lock, a disk lock, a push lock, or combinations thereof. The lock 380 may have a locking mechanism 381 contained therein that is movable between a locked position and an unlocked position so as to lock and unlock the lock 380 when the end 173 of the pin 170 having the notch 175 is received in the lock 380. The locking mechanism 381 is illustrated in FIG. 3A on the side of the lock 380. Other portions of the locking mechanism 381 (e.g., internal parts that engage the notch 175 of the pin 170) can be contained within the lock 380, are known in the art with the aid of this disclosure, and are not illustrated for clarity.

In the embodiment illustrated in FIG. 3A the lock 380 can be connected to side wall 340 such that the locking mechanism 381 is accessible through the opening 345 in the side wall 340. Similar to the opening 183 of the lock 180 in FIG. 1A, the lock 380 in FIG. 3A can have an opening that is configured to receive the end 173 of the pin 170 having the notch 175. The lock 380 can be configured such that the opening for the pin 170 faces towards the partition wall 150 of the door guard 300.

Alternative embodiments of the door guard 300 can include a second top guard, for example, positioned similarly to the top guard 220A of the door guard 200 in FIG. 2A.

FIG. 3B illustrates an isolated perspective view of the lock 380 in FIG. 3A.

The lock 380 can have a base unit 385 and a side panel 382, a top panel 383, and a bottom panel 384 connected to the base unit 385.

The base unit 385 of the lock 380 can have length in a range of about 0.5 to about 5 inches; alternatively, from about 0.5 to about 2 inches; alternatively, a length of about 0.708 inch. The base unit 385 of the lock 380 can have a width in a range of about 0.5 to about 5 inches; alternatively, from about 1 to about 2 inches; alternatively, a width of about 1.654 inches. The base unit 385 of the lock 380 can have a height in a range of about 0.5 to about 5 inches; alternatively, from about 1 to about 2 inches; alternatively, a height of about 1.614 inches. The base unit 385 can have a hollow interior configured to house internal parts of the locking mechanism 381.

The side panel 382 is connected to a side of the base unit 385. The side panel 382 can run the entire height of the base unit 385 of the lock 380. The side panel 382 can have a length in a range of about 0.5 to about 2 inches; alternatively, a length of about 0.0.591 inch. The side panel 382 can have a width in a range of about 0.1 to about 0.2 inch; alternatively, a width of about 0.118 inch. The side panel 382 can have a height in a range of about 0.5 to about 5 inches; alternatively, from about 1 to about 2 inches; alternatively, a height of about 1.614 inches. The side panel 382 can be attached to the main plate 110 and can extend past the main portion of lock 380 to help absorb any shock or force directed by outside forces at the lock 380. The side panel 382 can also help stabilize the lock 380.

The top panel 383 is connected to a top 386 of the base unit 385 of the lock 380. The top panel 383 can have a length in a range of about 0.2 to about 1 inch; alternatively, from about 0.4 to about 1 inch; alternatively, a length of 0.473 inch. The top panel 383 can have a width in a range of about 1 to about 3 inches; alternatively, from about 1 to about 2 inches; alternatively, a width of about 1.536 inches. The top panel 383 can have a height in a range of about 0.1 to about 0.5 inch; alternatively, from about 0.1 to about 0.2 inch; alternatively, a height of about 0.157 inch.

The bottom panel 384 is connected to a bottom 387 of the base unit 385 of the lock 380. The bottom panel 384 can have a length in a range of about 0.2 to about 1 inch; alternatively, from about 0.4 to about 1 inch; alternatively, a length of 0.473 inch. The bottom panel 384 can have a width in a range of about 1 to about 3 inches; alternatively, from about 1 to about 2 inches; alternatively, a width of about 1.536 inches. The bottom panel 384 can have a height in a range of about 0.1 to about 0.5 inch; alternatively, from about 0.1 to about 0.2 inch; alternatively, a height of about 0.157 inch.

The main plate 110, the top guard 120, the side wall 340, the partition wall 150, and the lock 380 are configured and arranged to form a space S8. The space S8 formed by the arrangement is configured to receive the handle, the latch, or both the handle and the latch of the latching handle assembly of the door that is to be guarded by the door guard 300. The top guard 120 can be configured to cover a portion of the handle of the latching handle assembly and configured to extend over the handle to prevent the handle from being lifted vertically while the door guard 300 is positioned over and coupled with the latching handle assembly.

The main plate 110, the bottom guard 330, the side wall 340, and the partition wall 150 of the door guard 300 are configured and arranged such that there is no opening for access to the interior space S9 of the door guard 300 in order to reach the pin 170. In the embodiment illustrated in FIG. 3A, the locking mechanism 381 faces outward from the side of the door guard 300, and the arrangement of the main plate 110, the bottom guard 330, the side wall 340, the partition wall 150, and the handle of the latching handle assembly that is received in space S8 substantially enclose the space S9 in which the portion 171 of the pin 170 can be received when locking the pin 170 in the lock 380, and in which the portion 171 of the pin 170 is inserted into the latch of the latching handle assembly when the door guard 300 is placed on the latching handle assembly. Because the space S9 is enclosed, access to the space S9 for destruction of the pin 170 is hindered and can be prevented.

The door guard 300 in FIG. 3A has the pin 170 extending through the handle and the latch (e.g., a hole in the handle and a hole in the locking plate of the latch) of the latching handle assembly of a container door instead of a padlock. Moreover, the door guard 300 uses the main plate 110, partition wall 150, bottom guard 330, and side wall 340 to substantially enclose the pin 170 and prevent access to the pin 170. No opening is formed between a bottom of the lock 380 and a top of the bottom guard 330. Moreover, by integrating the securing mechanism (e.g., the pin 170) for the latching handle assembly into the door guard 300 itself and using portions of the door guard 300 to block access to the pin 170, the disclosed door guard 300 removes access to the traditionally used padlock (because no padlock is used) and blocks access to the pin 170 from all sides and from the bottom of the door guard 300. When used on a latching handle assembly, access to the pin 170 from above is blocked by the handle of the latching handle assembly that is received in space S8 and the latch of the latching handle assembly that is received in space S9. In some embodiments, an additional top guard, such as the top guard 220A described for door guard 200 in FIG. 2A, can block access to the pin 170 from the top of the door guard 300.

Figure 4A:
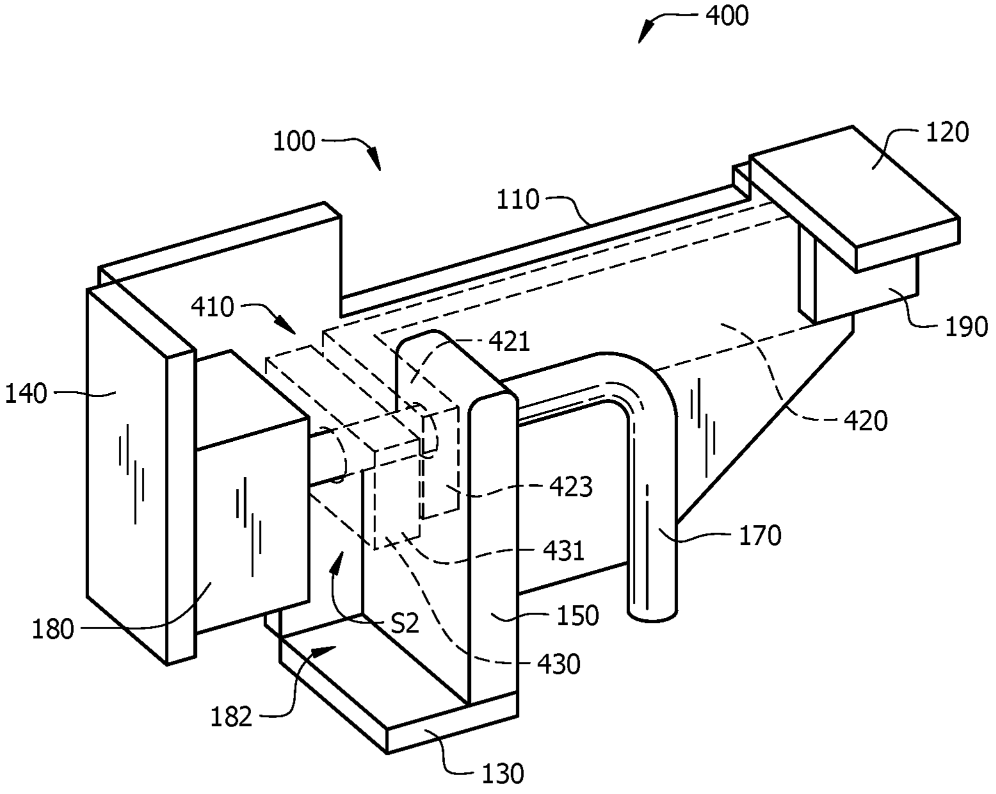
FIG. 4A illustrates a perspective view of a door guard system according to the disclosure.
Figure 4B:
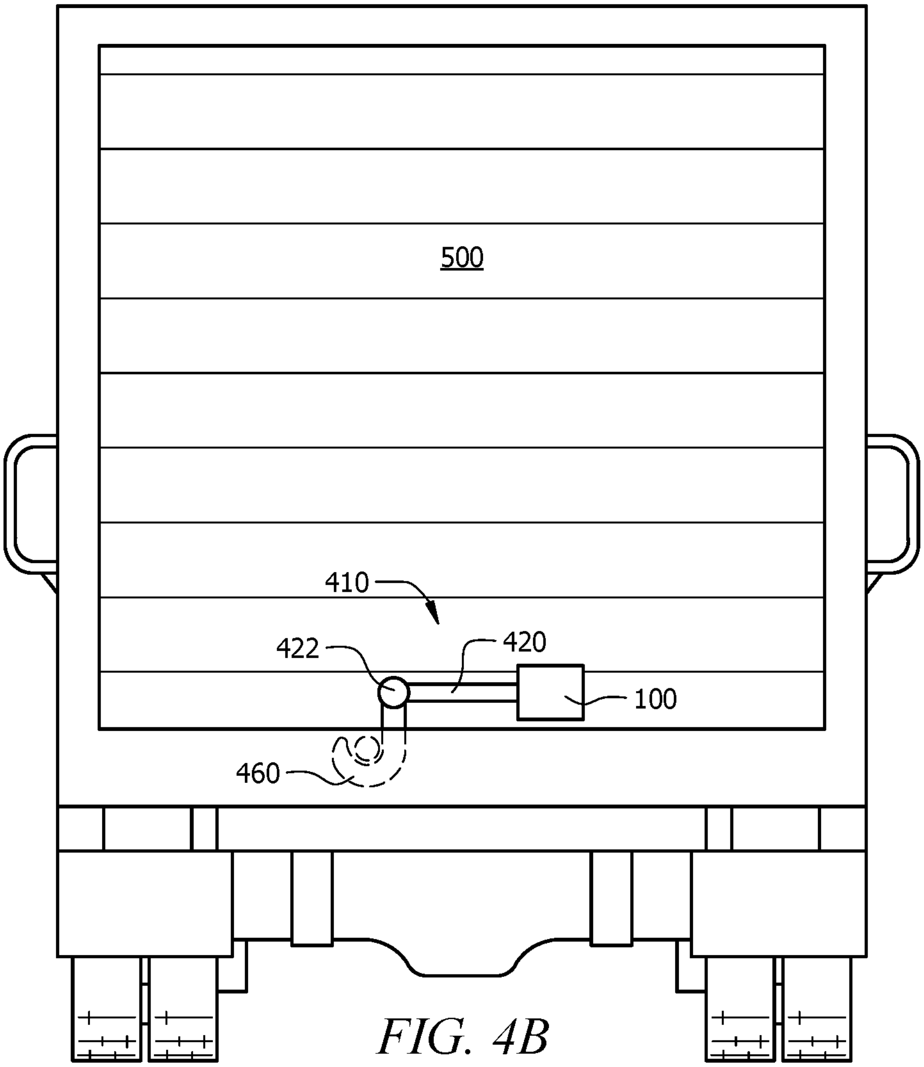
FIG. 4B illustrates a side view of the door guard system in relation to a roll-up door according to the disclosure.

FIG. 4A illustrates a perspective view of a door guard system 400 according to the disclosure, and FIG. 4B illustrates a side view of the door guard system 400 on a roll-up door 500.

The door guard system 400 can include a door guard (e.g., door guard 100 of FIG. 1A) and a latching handle assembly 410. Door guard 100 is used in FIGS. 4A and 4B for exemplary purposes, and it is contemplated that any embodiment of door guard 100/200/300 (or other embodiment) can be used as part of a door guard system 400.

The latching assembly 410 can comprise a handle 420 and a locking plate 430. The latching handle assembly 410 also include, as illustrated in FIG. 4B, a hook 460 (e.g., also known as a J-hook). The locking plate 430 can be attached to the door (e.g., roll-up door 500 in FIG. 4B) of the storage container (e.g., box truck), or can be part of a pivoting latch having another portion pivotally attached to the door as is disclosed in U.S. Pat. No. 3,642,314. The end 421 of the handle 420 and the locking plate 430 have holes formed therein that align together when the handle 420 is in the closed or locked position. The pin 170 of the door guard 100 can be seen extending through the holes of the end 421 of the handle 420 and the locking plate 430 in FIG. 4A. As shown in FIG. 4B, the handle 420 can have an opposite end 422 that is pivotally attached to the door 500, and which is attached to the hook 460.

The door guard 100 can be secured around the end 421 of the handle 420 and the locking plate 430 of the latching handle assembly 410. The end 421 of the handle 420 and the locking plate 430 of the latching handle assembly 410 are both located between the lock 180 and the partition wall 250 of the door guard 100. As can be seen, the handle 420 is positioned between the partition wall 150 and the main plate 110 in space S1 (e.g., space S1 is labeled in FIG. 1A). The top guard 120 can extend over the handle 420 to prevent the handle 420 from being pivoted while the door guard 100 is attached. As can be seen in FIG. 4A, the handle 420 extends between the main plate 110 and the securing plate 190 of the door guard 100.

It can be seen that the locking plate 430 and end 421 of the handle 420 block access to the pin 170 from above the pin 170; and the main plate 110, bottom guard 130, side wall 140, partition wall 150, and door 500 (in FIG. 4B) block access to the pin 170 from all sides and from below the door guard 100. When the pin 170 is in the lock 180, the handle 420 cannot be lifted even if the latch 450 were to be pivoted into the open position because the pin 170 extends through the holes of the end 421 of the handle 420 and the locking plate 430.

In FIG. 4B, the hook 460 can rotate when the second end 422 of the handle 420 is pivoted between the closed or locked position and the open or unlocked position. In the closed position or locked position, the hook 460 can be closed down around a member to prevent the door 500 from being raised. When the handle 420 is pivoted into the open position or unlocked position, the hook 460 may pivot to allow the hook 460 past the member, allowing the door to be raised.

Although the present disclosure and its advantages have been described in detail, it should be understood that various changes, substitutions and alterations can be made herein without departing from the spirit and scope of the disclosure as defined by the appended. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A door guard for use with a latching handle assembly, the door guard comprising:

a guard body comprising a main plate, a bottom guard connected to a bottom of the main plate, and a side wall connected to a side of the main plate;

a partition wall connected to a surface of the main plate, wherein the partition wall has a ridge formed in an upper portion thereof, wherein the ridge is configured to receive a handle of the latching handle assembly, wherein the partition wall has a first opening formed therein;

a pin having a lockable end configured to extend through the first opening of the partition wall and a free end, wherein the lockable end of the pin is further configured to extend through a hole in the handle of the latching handle assembly when the door guard is placed on the latching handle assembly and the handle is received in the ridge of the partition wall; and a non-padlock lock connected to the surface of the main plate and to the side wall, wherein the lock is configured to receive the lockable end of the pin, wherein the lock contains a locking mechanism configured to secure the lockable end of the pin within the lock;

wherein the guard body, the partition wall, and the lock are arranged to at least substantially enclose a portion of the pin that extends through the hole in the handle of the latching handle assembly when the door guard is placed on the latching handle assembly.

2. The door guard of claim 1, further comprising a second opening formed between a bottom of the lock and a top of the bottom guard, wherein the second opening has a height of greater than 0.0 inch and less than 0.3 inches.

3. The door guard of claim 2, further comprising:

a first top guard connected to a top of the main plate proximate an opposite side of the main plate and configured to extend over a portion of the handle of the latching handle assembly when the door guard is placed on the latching handle assembly.

4. The door guard of claim 3, further comprising:

a second top guard connected to a top of the main plate proximate the side of the main plate and configured to extend over the lock.

5. The door guard of claim 3, further comprising:

a securing plate that extends perpendicularly downward from the first top guard, wherein the handle of the latching handle assembly is placed between the securing plate and the main plate when the door guard is placed on the latching handle assembly.

6. The door guard of claim 1, wherein the guard body, the partition wall, and the lock are arranged to completely enclose the portion of the pin that extends through the handle of the latching handle assembly when the door guard is placed on the latching handle assembly.

7. The door guard of claim 6, wherein the side wall has a side wall opening formed therein, wherein the locking mechanism of the lock is accessible through the side wall opening.

8. The door guard of claim 6, further comprising:

a top guard connected to a top of the main plate proximate an opposite side of the main plate and configured to extend over a portion of the handle of the latching handle assembly when the door guard is placed on the latching handle assembly.

9. The door guard of claim 8, further comprising:

a securing plate that extends perpendicularly downward from the top guard, wherein the handle of the latching handle assembly is placed between the securing plate and the main plate when the door guard is placed on the latching handle assembly.

10. The door guard of claim 1, wherein the partition wall has a length in a range of from 0.1 to 1 inch.

11. A door guard system comprising:

a latching handle assembly comprising a handle having an end pivotably attached to a roll-up door and an opposite end having a hole formed in the handle; and a door guard comprising:

a guard body comprising a main plate, a bottom guard connected to a bottom of the main plate, and a side wall connected to a side of the main plate;

a partition wall connected to a surface of the main plate, wherein the partition wall has a ridge formed in an upper portion thereof, wherein the ridge is configured to receive the handle of the latching handle assembly, wherein the partition wall has a first opening formed therein;

a pin having a lockable end configured to extend through the first opening of the partition wall and a free end, wherein the lockable end of the pin is further configured to extend through the hole in the handle of the latching handle assembly when the door guard is placed on the latching handle assembly and the handle is received in the ridge of the partition wall; and a non-padlock lock connected to the surface of the main plate and to the side wall, wherein the lock is configured to receive the lockable end of the pin, wherein the lock contains a locking mechanism configured to secure the lockable end of the pin within the lock;

wherein the guard body, the partition wall, and the lock are arranged to at least substantially enclose a portion of the pin that extends through the hole in the handle of the latching handle assembly when the door guard is placed on the latching handle assembly.

12. The door guard of claim 11, further comprising a second opening formed between a bottom of the lock and a top of the bottom guard, wherein the second opening has a height of greater than 0.0 inch and less than 0.3 inches.

13. The door guard of claim 12, further comprising:

a first top guard connected to a top of the main plate proximate an opposite side of the main plate and configured to extend over a portion of the handle of the latching handle assembly when the door guard is placed on the latching handle assembly.

14. The door guard of claim 13, further comprising:

a second top guard connected to a top of the main plate proximate the side of the main plate and configured to extend over the lock.

15. The door guard of claim 13, further comprising:

a securing plate that extends perpendicularly downward from the first top guard, wherein the handle of the latching handle assembly is placed between the securing plate and the main plate when the door guard is placed on the latching handle assembly.

16. The door guard of claim 11, wherein the guard body, the partition wall, and the lock are arranged to completely enclose the portion of the pin that extends through the handle of the latching handle assembly when the door guard is placed on the latching handle assembly.

17. The door guard of claim 16, wherein the side wall has a side wall opening formed therein, wherein the locking mechanism of the lock is accessible through the side wall opening.

18. The door guard of claim 16, further comprising:

a top guard connected to a top of the main plate proximate an opposite side of the main plate and configured to extend over a portion of the handle of the latching handle assembly when the door guard is placed on the latching handle assembly.

19. The door guard of claim 18, further comprising:

a securing plate that extends perpendicularly downward from the top guard, wherein the handle of the latching handle assembly is placed between the securing plate and the main plate when the door guard is placed on the latching handle assembly.

20. The door guard of claim 11, wherein the partition wall has a length in a range of from 0.1 to 1 inch.

* * * * *